C. P. SAVAGE & J. W. SILVER.
AEROPLANE.
APPLICATION FILED JAN. 27, 1910.

990,011.

Patented Apr. 18, 1911.

4 SHEETS—SHEET 4.

Witnesses

Inventors
C. P. Savage
and J. W. Silver
by A. B. Wilson & Co.
Attorneys

UNITED STATES PATENT OFFICE.

CHARLES P. SAVAGE AND JESSE W. SILVER, OF TACOMA, WASHINGTON.

AEROPLANE.

990,011.  Specification of Letters Patent.  Patented Apr. 18, 1911.

Application filed January 27, 1910. Serial No. 540,363.

*To all whom it may concern:*

Be it known that we, CHARLES P. SAVAGE and JESSE W. SILVER, citizens of the United States, residing at Tacoma, in the county of Pierce and State of Washington, have invented certain new and useful Improvements in Aeroplanes; and we do declare the following to be a full, clear, and exact description of the invention, such as will enable others skilled in the art to which it appertains to make and use the same.

This invention relates to an aeroplane of that type in which a series of balancing planes are employed for maintaining the lateral balance or equilibrium of the machine, and for rendering the machine more self-supporting.

The object of this invention is to provide the aeroplane with a pair of rotary balancing planes at each side of the longitudinal center and to employ suitable mechanism driven from the propeller shaft and under the control of the aviator, whereby the perfect balance or equilibrium of the machine as a whole may be maintained, whereby the machine will be rendered more self-supporting and whereby the speed of the machine may be increased.

With the foregoing and other objects in view, the invention consists of certain novel features of construction, combination and arrangement of parts, as will be more fully described and particularly pointed out in the appended claims.

Figure 1:
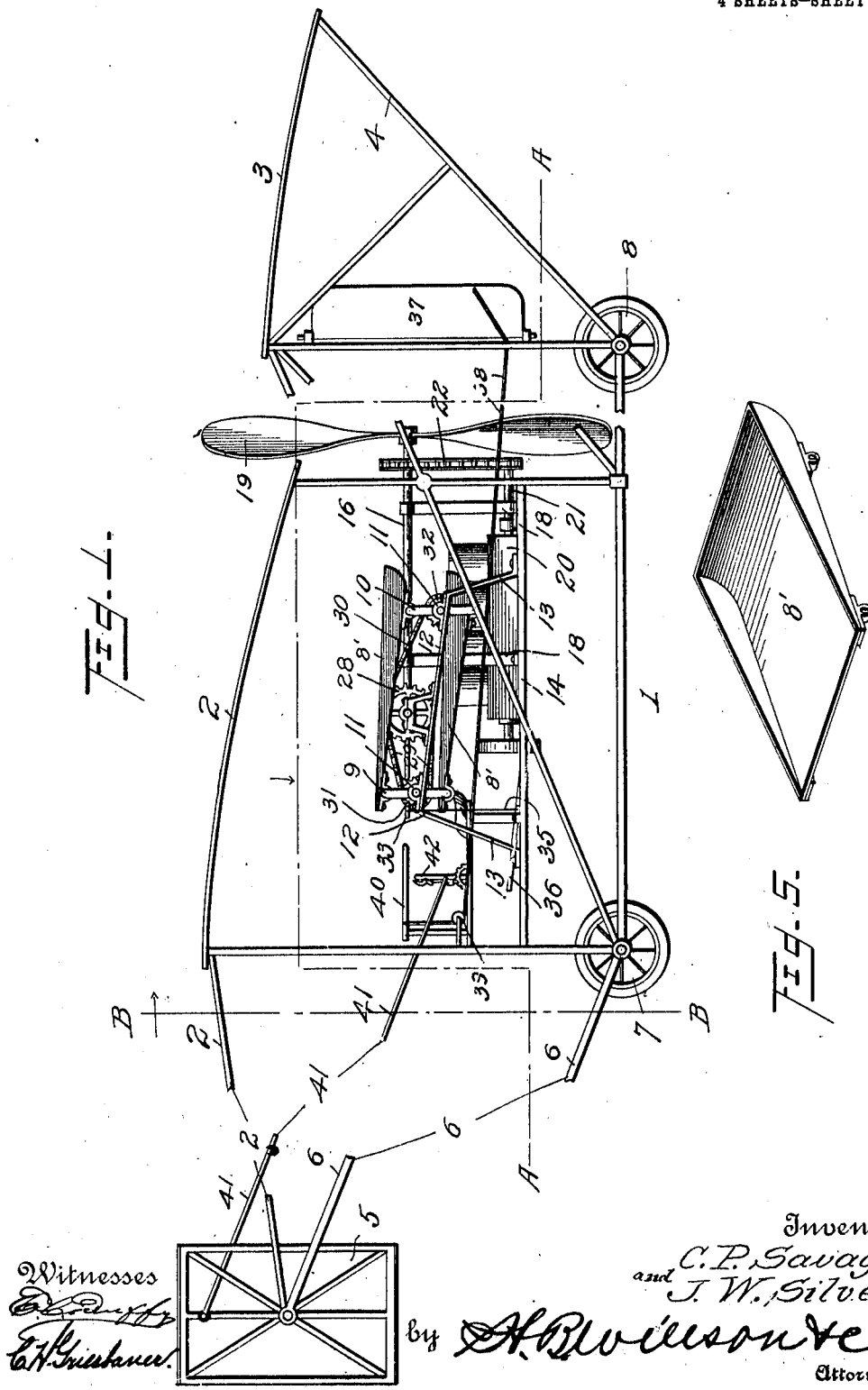
Figure 2:
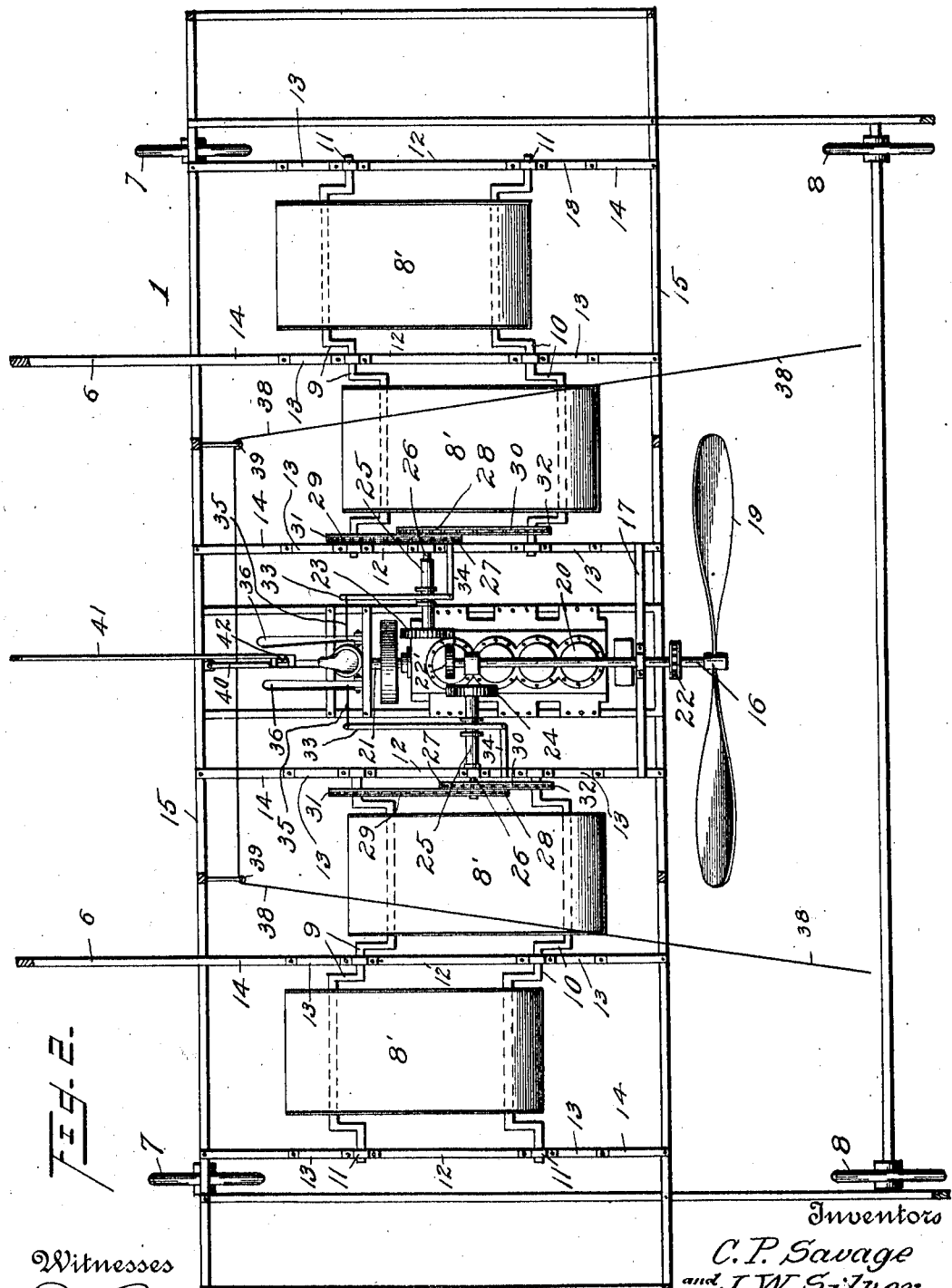
Figure 3:
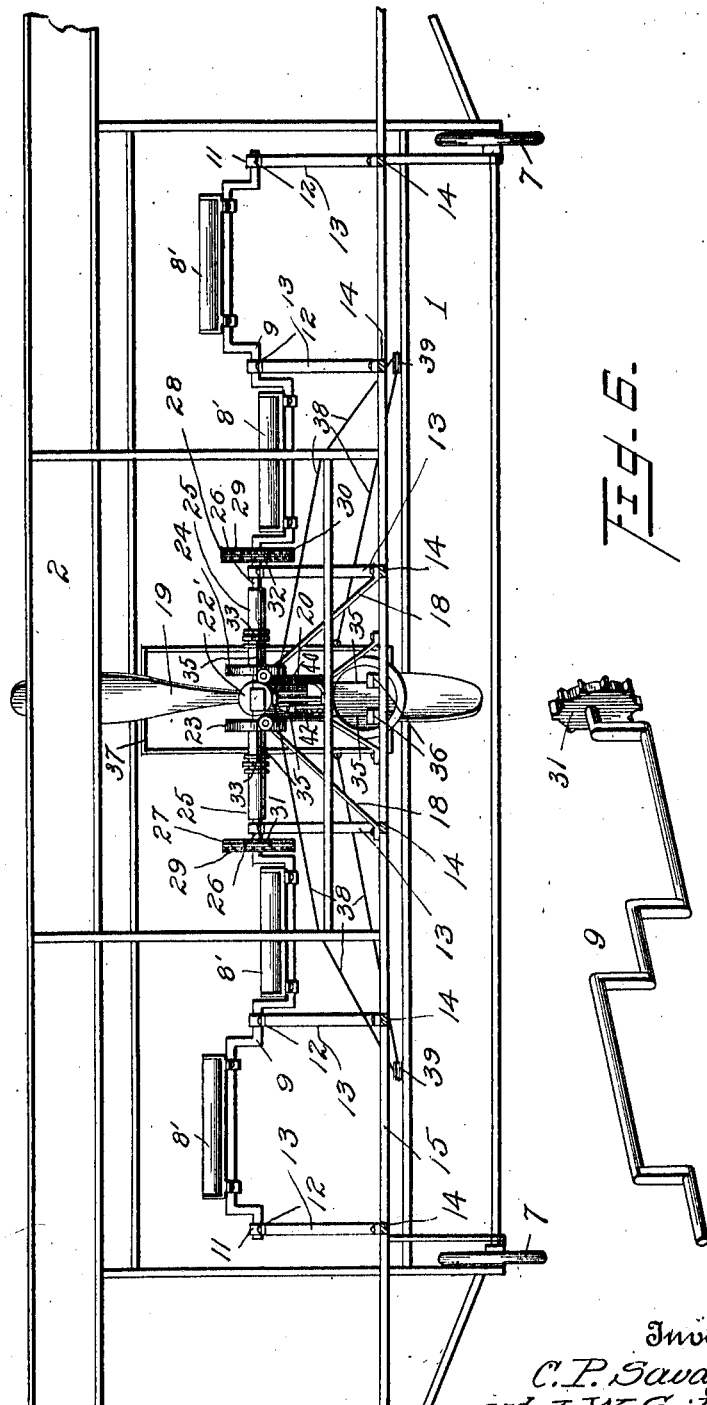
Figure 4:
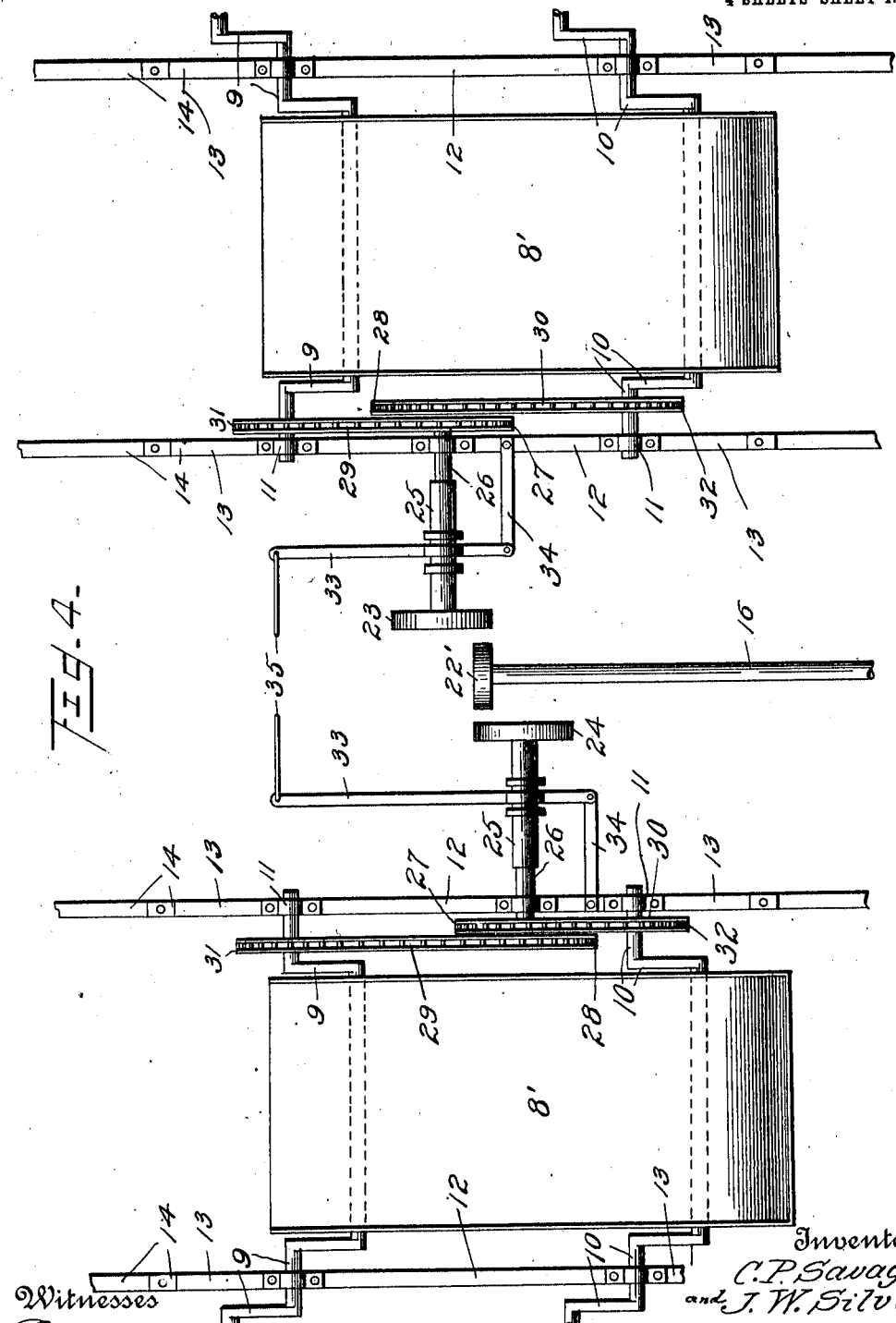

In the accompanying drawings, Figure 1 is a side elevation of the complete machine embodying our improvements which are more particularly directed to the balancing and lifting planes. Fig. 2 is a horizontal section taken on the line A—A of Fig. 1, and Fig. 3 is a transverse sectional view taken on the line B—B of Fig. 1, looking rearwardly. Fig. 4 is a fragmentary plan view on an enlarged scale of the balancing planes;
Fig. 5 is a detail perspective view of one of the balancing planes; and Fig. 6 is a similar view of one of the double crank shafts for driving the balancing planes.

Referring to the drawings for a more particular description of the invention, which are for illustrative purposes only, and are therefore not drawn to scale, the numeral 1 indicates the main supporting frame which carries, the main supporting plane 2, which is disposed at a suitable angle of incidence.

The numeral 3 indicates the rear supporting plane which is carried by the frame 4, and 5 the rising plane which is mounted upon the forwardly extending converging bearing bars 6 which extend from the main supporting frame 1. The machine is equipped with the usual front and rear supporting trucks 7 and 8, respectively, the purpose of which will be obvious.

It is to be understood that the parts above referred to may be of any ordinary or preferred construction, as this constitutes no part of the present invention.

The balancing planes 8', to which our improvements are especially directed, are arranged in pairs in the main supporting frame 1 at opposite sides of the longitudinal center of the machine. Each pair of balancing planes 8 is carried by a pair of double crank shafts 9 and 10, respectively, the ends of which are mounted in suitable bearings 11 arranged upon the horizontal downwardly and rearwardly inclined bearing bars 12, supported upon the standards 13, which are in turn, mounted upon the longitudinal supporting members 14 extending between the side pieces 15 of the main supporting frame 1. Each pair of balancing planes is so arranged that when one plane is moving downwardly and rearwardly, the other plane is moving forwardly and upwardly.

The propeller shaft 16 is revolubly mounted upon the horizontal cross piece 17, which is supported upon the members 14 by the standards 18. The rear end of the propeller shaft projects somewhat in rear of the main supporting frame and is provided with the propeller 19, which may be of any ordinary form.

The driving motor 20 which may be of any appropriate form possessing the required lightness for a given amount of horse power, is suitably mounted in the main frame between and somewhat beneath the two pairs of balancing planes. The drive shaft 21 of this motor, is connected with the propeller shaft by suitable sprocket and chain connection 22, whereby the power of the motor is transmitted to drive the propeller.

We will now describe a form of friction gearing under the control of the operator, whereby both pairs of balancing planes may be operated in unison or whereby either pair of planes may be operated independently of the other pair and while the other pair is in a state of rest, whereby the perfect lateral balance or equilibrium of the machine is within full control of the operator at all stages of the flight and whereby the machine is rendered more self-supporting, as a whole.

A friction wheel 22' is arranged at the front end of the propeller shaft 16 and is adapted to engage either of a pair of friction disks 23 and 24, respectively, carried by the sleeves 25, which are slidable upon the shafts 26, whereby either or both of the friction disks 23 and 24 may be thrown into or out of engagement with the friction wheel 22 of the propeller shaft. The outer ends of the shafts 26 are provided with a pair of adjacent sprocket wheels 27 and 28, which are connected by the sprocket chains 29 and 30, with the pinions 31 and 32, arranged respectively at the inner ends of the crank shafts 9 and 10. A pair of sleeve-operating bars 33 are pivoted at their rear ends to bearings or brackets 34, are engaged with the disk-carrying sleeves, and are connected at their forward ends by the links 35 with the foot-treadles 36. By these connections, by depressing either of the foot-treadles, the corresponding disk 23 or 25 will be moved into engagement with the friction wheel 22, whereby the corresponding pair of balancing planes will be thrown into operation to regain the equilibrium of the machine or for other reasons heretofore specified. The rudder 37 of any suitable form is mounted in the rear supporting plane frame and is connected at opposite sides by means of the tiller ropes or cables 38 which pass over pulleys 39 suitably mounted in the frames of the machine to the tiller 40 pivoted in the main supporting frame within convenient reach of the operator. By these connections, the rudder may be adjusted at a suitable incline at either side of the machine to direct the horizontal course of the machine.

The rising plane 5 which is mounted at the front of the machine, as before described, may be tilted at different angles to control the upward and downward course of the machine by the operating rod 41 connected with the operating lever 42 arranged in the main frame 1 within convenient reach of the operator and retainable at different adjustments by the usual pawl and ratchet device.

It will be observed that owing to their mounting the balancing planes travel forwardly and downwardly at the same time, thereby securing their downward or partially downward thrust upon the air without the shock or loss of power entailed by a direct rectilinear or up and down movement.

It is a well established fact that it is the high rate of speed at which aeroplanes are driven through the air that maintains or supports the machine and that frequent rapid head-on flights are necessary to effect the maintenance of the machine. By providing our balancing planes, however, the machine is rendered greatly more self-supporting and will maintain itself in position when driven at a relatively low rate of speed. As heretofore explained, as the outer balancing plane of each pair of planes is moving downwardly and rearwardly, and acts in connection with the propeller to move the machine forwardly, the inner plane of each pair is moving upwardly and forwardly and acts as a supplementary plane to support the machine upon the supporting air strata. Should one side of the machine tilt downwardly, to regain the perfect lateral balance or equilibrium of the machine, it is only necessary to depress the foot-treadle at that side of the machine to throw the corresponding pair of balancing planes into operation for a limited time. The balancing planes may be of any suitable size and shape and may be constructed from any suitable material found best in the actual use of the machine.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

What is claimed as new is:—

1. In an aeroplane, a main frame, a pair of crank shafts on each side of the longitudinal center of the machine, a pair of balancing planes operatively mounted on each pair of said crank shafts, suitable friction gearing for driving the balancing planes from the propeller shaft so that one of said planes is rising when the other of said planes is falling, and means under the control of the operator, whereby both pairs of planes may be driven in unison or either pair of planes may be driven independently of the other pair.

2. In an aeroplane, a main supporting frame, a pair of transversely-disposed double crank shafts mounted at each side of the longitudinal center of the machine, one in front of the other, a pair of balancing planes carried by each of the rock shafts and adapted to be given a downwardly and rearwardly and an upwardly and forwardly movement during each rotation of said shafts one of said planes being adapted to rise while the other plane is falling on each of said crank shafts, and suitable gearing for driving both pairs of rock shafts in unison or either pair of shafts independently of the other pair from the propeller shaft.

3. In an aeroplane, a main frame, a pair of double crank shafts arranged in said frame at each side of the longitudinal center of the machine with one of said shafts directly in front of the other, a pair of balancing planes carried by each pair of said shafts and suitable gearing for driving both pairs of planes from the propeller shaft in unison or independently, the cranks of each crank shaft extending in opposite directions, whereby as the outer plane of each pair is moving downwardly and rearwardly, the other plane is moving upwardly and forwardly.

4. In an aeroplane, a main supporting frame, a pair of crank shafts mounted at each side of the longitudinal center of the machine, one in front of the other, balancing planes carried by the rock shafts, a propeller shaft, gearing including a pair of sprocket wheel-carrying shafts for driving the crank shafts from the propeller shaft, a friction wheel at the rear end of the propeller shaft, friction disks slidably mounted on the sprocket wheel-carrying shafts whereby they may be thrown into or out of engagement with the disk on the propeller shaft and treadle-operated means for engaging or disengaging either or both of said movable friction disks with the friction disk of the propeller shaft.

5. In an aeroplane, a main-supporting frame, a pair of double crank shafts mounted at each side of the longitudinal center of the machine, a pair of balancing planes carried by each of said crank shafts, a propeller shaft, means whereby the propeller shaft may rotate either of said crank shafts, each of the balancing planes being provided with an inclined lower face and a curved end, and also provided with bearing members upon their lower faces.

6. In an aeroplane, a main-supporting frame, a pair of oppositely-extending driven shafts rotatably mounted in said frame and provided with friction disks at their inner ends, a driving shaft adapted to rotate either or both of said shafts, sprocket wheels secured at the outer ends of said driven shafts, a pair of crank shafts rotatably mounted in said frame adjacent each of said driven shafts, balancing planes carried by each pair of crank shafts, sprocket wheels upon each of said crank shafts, and a sprocket chain connecting the sprocket wheels upon the crank shafts and driven shafts.

7. In an aeroplane, a main supporting frame, a pair of oppositely-extending driven shafts suitably mounted upon said frame and provided with friction disks at their inner ends, a driving shaft adapted to rotate either or both of said shafts, a pair of sprocket wheels carried by each of said driven shafts adjacent their outer extremities, a pair of spaced double crank shafts rotatably mounted in said frame adjacent each of the driven shafts, a pair of balancing planes mounted upon each pair of crank shafts, sprocket wheels upon each of said crank shafts adjacent its inner extremity, and a pair of sprocket chains connecting the sprocket wheels upon the crank shafts and driven shafts.

8. In an aeroplane, a main supporting frame, bearings suitably mounted thereon, a pair of driven shafts slidably and rotatively mounted in said bearings and provided with friction disks at their inner ends, said driven shafts being positioned in parallel planes so that the adjacent edges of the friction disks overlap, a driving shaft provided with a friction disk at its extremity adapted to contact with the adjacent faces of the friction disks upon said driven shafts, means under the control of the operator for sliding either or both of said driven shafts into or out of engagement with the friction disk upon the driving shaft, a pair of double crank shafts rotatively mounted adjacent the outer extremities of each of said driven shafts, balancing planes carried by each pair of crank shafts, and means connecting the driven shafts and crank shafts whereby the crank shafts are rotated.

In testimony whereof we have hereunto set our hands in presence of two subscribing witnesses.

CHARLES P. SAVAGE.
JESSE W. SILVER.

Witnesses:
C. O. GUNDERSON,
C. H. EVERETT.